United States Patent [19]
Peairs

[11] Patent Number: 6,069,978
[45] Date of Patent: *May 30, 2000

[54] METHOD AND APPARATUS FOR IMPROVING A TEXT IMAGE BY USING CHARACTER REGENERATION

[75] Inventor: Mark Peairs, Menlo Park, Calif.

[73] Assignee: Ricoh Company Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/956,767

[22] Filed: Oct. 22, 1997

Related U.S. Application Data

[63] Continuation of application No. 08/375,047, Jan. 18, 1995, abandoned, which is a continuation of application No. 08/124,325, Sep. 20, 1993, abandoned.

[51] Int. Cl.⁷ .................................................. G06K 9/40
[52] U.S. Cl. ........................................ 382/254; 382/218
[58] Field of Search ..................... 382/218, 219, 382/190, 181, 209, 266, 254; 345/467, 471

[56] References Cited

U.S. PATENT DOCUMENTS

| | | | |
|---|---|---|---|
| 3,188,609 | 6/1965 | Harmon et al. | 382/40 |
| 4,021,778 | 5/1977 | Ueda et al. | 340/146.3 |
| 4,058,795 | 11/1977 | Balm | 340/146.3 |
| 4,097,847 | 6/1978 | Forsen et al. | 340/146.3 |
| 4,383,307 | 5/1983 | Gibson, III | 364/900 |
| 4,674,065 | 6/1987 | Lange et al. | 364/900 |
| 4,769,851 | 9/1988 | Nishijima et al. | 382/34 |
| 4,771,268 | 9/1988 | Sone et al. | 382/188 |
| 4,887,303 | 12/1989 | Hongo | 382/34 |
| 4,926,491 | 5/1990 | Maeda et al. | 382/14 |
| 4,975,974 | 12/1990 | Nishijima et al. | 382/209 |
| 5,038,379 | 8/1991 | Sano | 382/1 |
| 5,121,441 | 6/1992 | Chefalas | 382/13 |
| 5,233,672 | 8/1993 | Yamanari et al. | 382/57 |
| 5,272,766 | 12/1993 | Higgins | 382/57 |
| 5,285,505 | 2/1994 | Kim | 382/13 |
| 5,319,721 | 6/1994 | Chefalas | 382/13 |

FOREIGN PATENT DOCUMENTS 1582807  8/1978  United Kingdom.

OTHER PUBLICATIONS

Dr. Heinz Munter, "Bit Für Bit zim fertigen Text," *Der Polygraph*, No. 20, 1990, pp. 2072, 2074.

*Primary Examiner*—Yon J. Couso
*Attorney, Agent, or Firm*—Philip H. Albert; Townsend and Townsend and Crew LLP

[57] ABSTRACT

A method and apparatus for improving a text image represented as a bitmap in a digital system. Character instances in the bitmap image are recognized and categorized according to their character type. The instances are used to derive a prototype character for each character type. The prototype character is an average of the instances, thus providing for cancellation of extraneous marks in the bitmap image. The prototype character is substituted for each character instance of its type in the bitmap image thus providing for uniformity of characters in a regenerated version of the original bitmap.

13 Claims, 8 Drawing Sheets

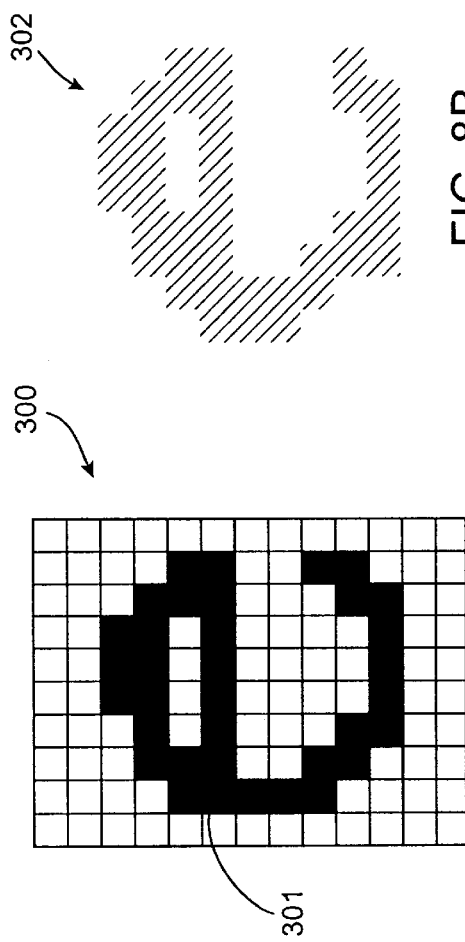
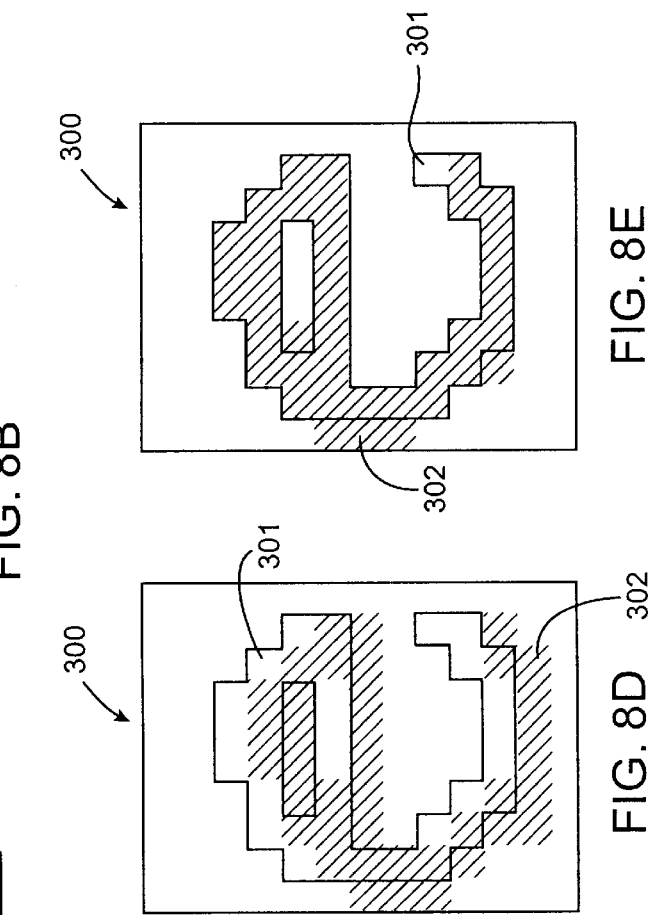
FIG. 8A
FIG. 8B
FIG. 8C
FIG. 8D
FIG. 8E

METHOD AND APPARATUS FOR IMPROVING A TEXT IMAGE BY USING CHARACTER REGENERATION

This is a Continuation of application Ser. No. 08/375,047, filed Jan. 18, 1995, now abandoned.

This is a Continuation of application Ser. No. 08/124,325, filed Sep. 20, 1993, now abandoned.

FIELD OF THE INVENTION

This invention relates generally to digital image processing and specifically to a system and method for improving digitally represented character images.

BACKGROUND OF THE INVENTION

Digital techniques are currently being applied to transfer information in a variety of ways. One common way uses a facsimile, or "fax," machine to transmit a document from one location to another. Typically, the document is converted into a digital bitmap representation at the sending location. Next, bits in the bitmap are converted to an electrical signal and are transmitted, e.g., over a phone line, to the intended destination. At the receiving end the electrical signals are converted back into a bitmap representation of the original document and the bitmap is used to reproduce a close approximation of the original document on paper.

However, it is well known that the transmission of a document via fax results in a document of lesser quality at the receiving end. This is due to various factors including "noise" in the sending, transmitting or receiving mechanisms; smudges or stray marks in the original document, or low resolution in scanning the document at the sending fax machine. Prior attempts to correct these problems include approaches by Lim and Adachi (J. S. Lim, "Two-Dimensional Signal and Image Processing," pp. 570–575, Prentice-Hall, 1990; Adachi, Kawanishi, Kobayashi, "Improvement of Character Recognition and Generation Techniques in Facsimile Communication Systems," pp. 732–738, Proceedings Seventh Annual Joint Conference of the IEEE Computer and Communication Societies, 1988). Lim makes an analysis operating on page size units, while Adachi operates by smoothing the representation of individual characters.

Therefore, a method and system which provides for improved reproduction of the received document at the receiving fax machine is desired.

SUMMARY OF THE INVENTION

The present invention provides for improving the reproduction of a text document at a receiving fax machine. The present invention may also be applied generally to improving any bitmap representation of a text document.

The invention achieves this by performing optical character recognition on each character instance in the bitmap and placing the instances into categories, one category for each character type present in the bitmap. For each given category, an "ideal" prototype character is derived for the category. The prototype character is then substituted for each instance of a character belonging to the prototype character's category in the bitmap image. After the above steps are performed for each category the resulting "regenerated" bitmap image is used to produce a final printed version of the document.

By deriving a prototype character and substituting the prototype character for each character of that type, the appearance of the resulting document is improved because "noise" in the form of extraneous marks, fuzzy edges, etc., is reduced or eliminated from the characters' representations. Also, since the same prototype character is used for every instance of a character of that type, the resulting document has uniformity in character type representation.

Different methods may be used to derive a prototype character from instances of a character.

A preferred embodiment, includes software executing on a digital system, the digital system including a processor, memory, user input device and output device. The method includes steps of: detecting character instances a bitmap image, selecting first and second instances of a character, using the selected instances to derive a prototype character, replacing the selected instances with the prototype character in the bitmap image to produce a regenerated bitmap image and outputting the regenerated bitmap image.

Additional steps reduce the effects of errors that may be incurred in the above steps, such as an error in selecting character instances. In a preferred embodiment, a comparison is made between each instance and the prototype characters for each category. If the instance more closely resembles a prototype character from a different category than the one the instance was originally associated with, then the instance is discarded from the original category and the derivation of the prototype character for that category is performed over without using the discarded character.

BRIEF DESCRIPTION OF THE DRAWINGS

FIG. 8A shows a matrix including a first instance of the letter "e";

FIG. 8B shows a second instance of the letter "e";

FIGS. 8C–E illustrate the alignment process of step 228 of the flowchart of FIG. 7;

DESCRIPTION OF A PREFERRED EMBODIMENT

Figure 1:
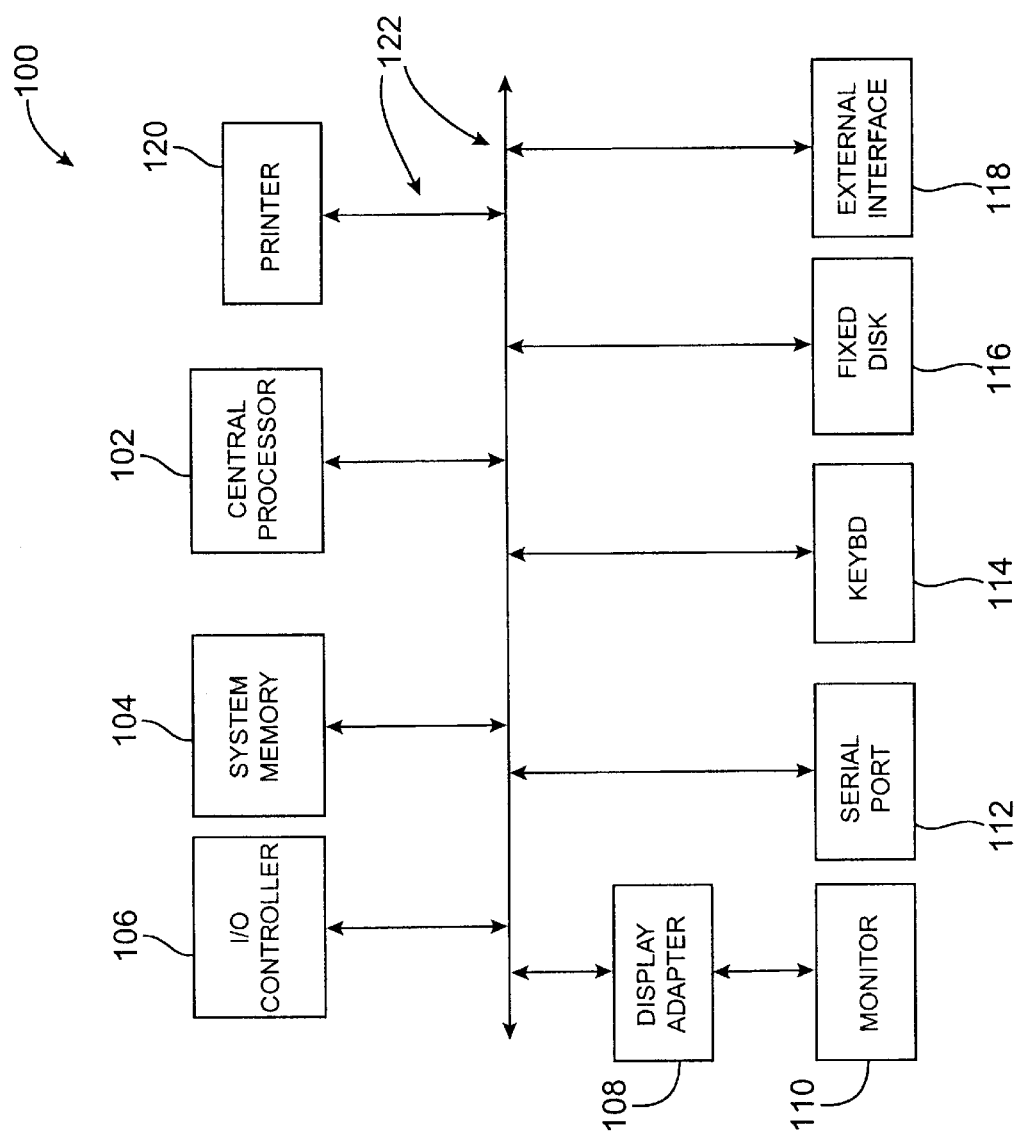
FIG. 1 is a diagram of a typical computer system used to execute the software of the present invention.

FIG. 1 is a diagram of an example of a typical computer system 100 used to execute the software of the present invention. Computer system 100 includes subsystems such as processor 102, memory 104, I/O controller 106, display adapter 108, monitor 110, serial port 112, keyboard 114, fixed disk 116, external interface 118, and printer 120. Other digital systems suitable for use with the present invention may include additional or fewer subsystems. For example, another digital system could include more than one processor 102 (i.e., a multi-processor system). Or, a system may include a cache memory. Subsystems such as display adapter 108 and monitor 110 may not be needed in some embodiments of the present invention, their functions being performed by, e.g., a light emitting diode ("LED") display.

Arrows such as 122 represent the system bus architecture of computer system 100. However, these arrows are illustrative of any interconnection scheme serving to link the subsystems. For example, printer 120 could be connected to the other subsystems through a port (not shown). In a preferred embodiment, a telephone line (not shown) is connected to computer system 100. This line serves to connect computer system 100 with an external fax machine. Computer system 100, itself, comprises the basic components of a receiving fax machine suitable for receiving and printing bitmap images of documents as described below.

When computer system 100 acts as a receiving fax machine, digital data representing a bitmap image of a document is received, e.g., through serial port 112, and stored in system memory 104. As described below, processor 102 operates on the bitmap image and system memory 104 to produce an improved bitmap image. The improved bitmap image is output through printer 120 to produce a paper document that is the image of the document transmitted from the sending fax machine.

Computer system 100 shown in FIG. 1 is but an example of a computer system suitable for use with the present invention. Other configurations of subsystems suitable for use with the present invention will be readily apparent to one of skill in the art. While the present invention is being discussed in a preferred embodiment as a fax application, other applications of the present invention, such as enhancing an image from a scanner, will be apparent.

Figure 2:
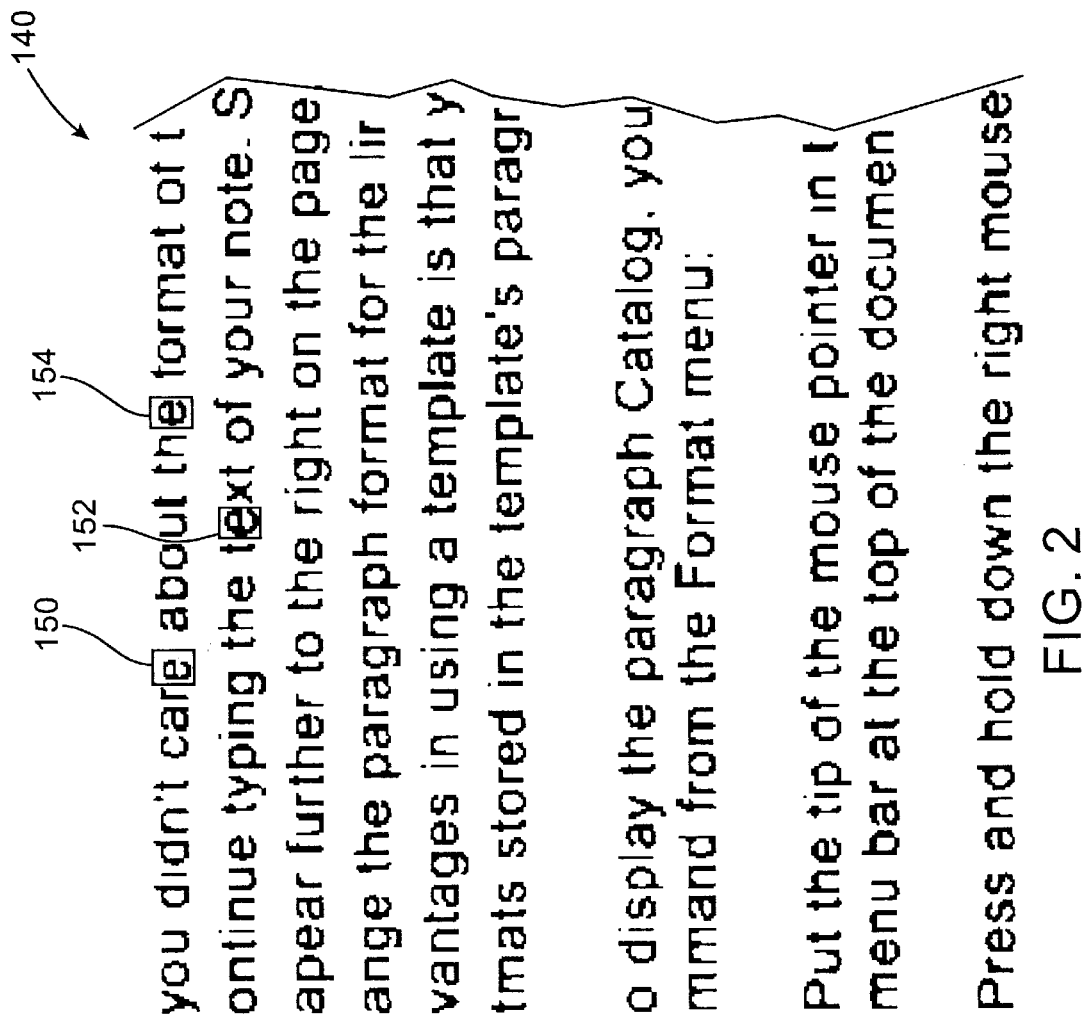
FIG. 2 shows a section of a bitmap image of a document.

FIG. 2 shows a section 140 of a bitmap image residing in system memory 104 of FIG. 1 in an example used to illustrate an embodiment of the present invention. From FIG. 2 it is seen that the section of bitmap image includes words made up of characters which are in turn made up of small rectangles or "pixels" (i.e., "picture elements") where one pixel corresponds to a bit in the bitmap image. At a typical fax scanning resolution of 100–200 dots per inch ("dpi"), a typical character might be 15–30 pixels across. Note that while the present invention is described herein using an example of 100–200 dpi scanning resolution, the invention is applicable to character representations of any number of pixel resolutions.

While figures such as FIG. 2 are used in this application to illustrate bitmap images, matrices, character instances, etc., it is understood that this representation is a human-readable form that will typically only exist, e.g., when the bitmap image, matrix or character instance is printed out. As is well-known in the art, a bitmap image, or the like, may be represented by an array, or other data structure, including words in memory that are often contiguous. Depending upon the number of values for each pixel (to represent grey scale, color, intensity, etc.) a word of memory, portion of a word of memory or multiple words of memory may be used to represent each pixel. The operations discussed herein, such as aligning, adding, etc., are described with respect to the human-readable form in the Figures but also have a computer "counterpart" that is well-known in the art. Thus, for example, where two character instances are "aligned" by visually placing the human-readable form of one over the human-readable form of the other, this operation is achieved in a computer system, such as computer system 100 of FIG. 1, by manipulating and comparing bit strings, arrays, etc., depending on the internal data representation of the specific implementation of the present invention.

Each character in the bitmap image of FIG. 2 is isolated and the character image is extracted or copied into a separate area of system memory. When a character is extracted, the pixels comprising the character along with blank pixels in the area immediately adjacent to the pixels comprising the character are considered as an "instance" or occurrence of the character. The identification of each individual character in the bitmap image is done by an optical character recognition ("OCR") method or system, as is commonly known in the art. In FIG. 2, three instances, 150, 152, and 154, of the letter "e" are shown within bounding boxes. Each instance of the letter "e" comprises the "on" or black, pixels and the "off", or white, pixels within the bounding box.

The recognition and extraction process is performed for each different character type within the bitmap image. Each different character type within the image is considered a separate class or category of character. So, for example, there are 52 character types, or categories, for the upper and lower case letters of the alphabet. Ultimately, the clusters of characters for each category are used to derive a prototype character that is a closer approximation to the originally transmitted character than the majority of extracted instances of characters in the cluster. Alternatively, the present invention provides a model character that is used at each instance of the character type in the bitmap image, thus providing uniformity of characters in the printed document at the receiving end.

Figure 3:
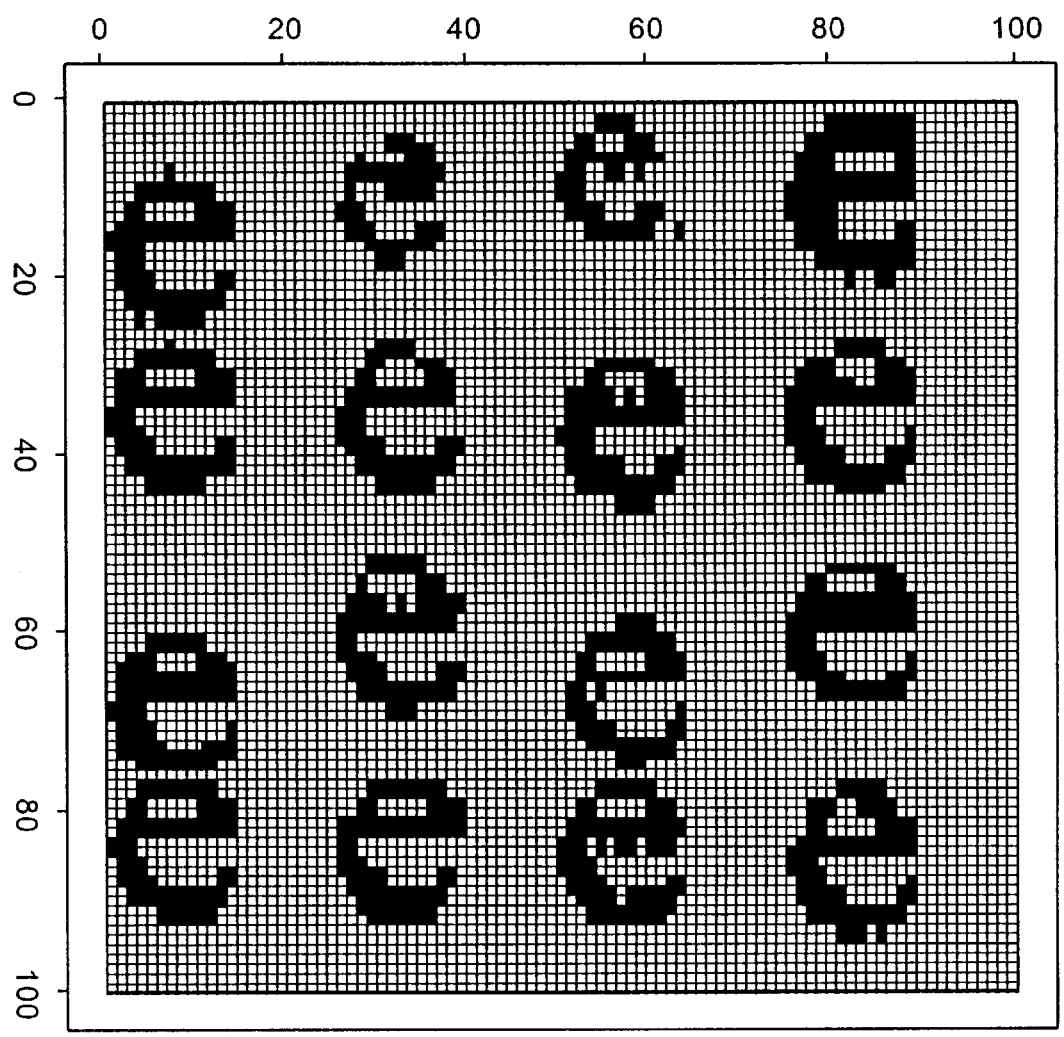
FIG. 3 shows a cluster for the character type "e".

FIG. 3 shows a cluster for the character type "e" after segmentation and extraction from a bitmap image such as the portion of bitmap image shown in FIG. 2. Note that each instance of the letter "e" is slightly different from another instance. The rectangular pixels that make up each "e" character are clearly visible at this enlarged resolution. The step of identifying each instance of a character of a specific category and grouping the instances together is called "clustering". A cluster of characters such as is represented in FIG. 3 can be maintained in memory by means of pointers to arrays were each array includes a bitmap image of the character instance. In the present discussion we assume that the bitmap image of the present invention includes 16 instances of the letter "e". Thus, FIG. 3 represents the entire cluster of character instances for the category of letter "e".

Figure 4:
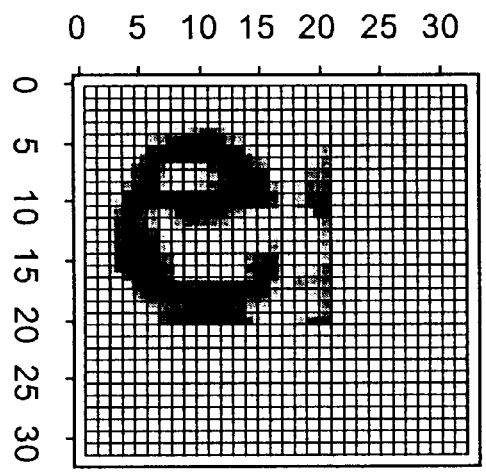
FIG. 4 shows a prototype character for the character type "e"

FIG. 4 shows the prototype character for the character type "e" whose cluster is shown in FIG. 3. The prototype character is shown in a grid or matrix. In order to derive the prototype character, all characters in the cluster of FIG. 3 were merged into a single character. Alternative embodiments of the invention do not use all of the instances of characters in deriving the prototype character as explained below. As shown in FIG. 4, the prototype "e" after the merge includes pixels of varying grey levels. This is because each of the instances in the cluster of FIG. 3 has been "added" into the matrix to generate the prototype character of FIG. 4. In FIG. 4, darker pixels are those whose position has occurred more frequently in each instance in the cluster while lighter pixels in FIG. 4 represent those pixels that have occurred less often in instances in the cluster.

Figure 5:
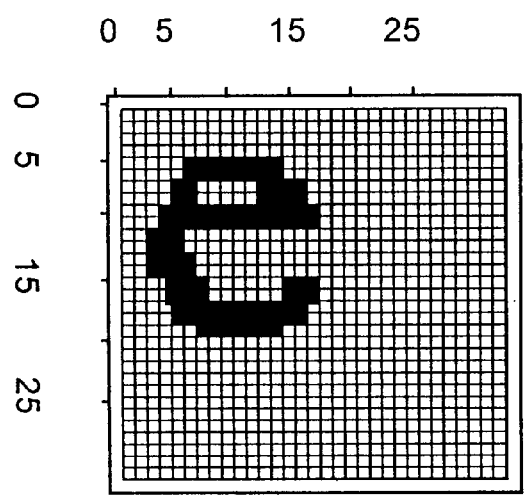
FIG. 5 shows the thresholded prototype character for the cluster of FIG. 3.

FIG. 5 shows the prototype character for the cluster of FIG. 3. In order to obtain the prototype character of FIG. 5, the merged character of FIG. 4 is subjected to a "thresholding" operation. The thresholding operation deletes pixels from the prototype character whose grey levels fall below a predetermined threshold.

The present invention will next be described in detail with reference to the flowcharts of FIGS. 6 and 7 and the illustrations of FIGS. 8A–9D.

Figure 6:
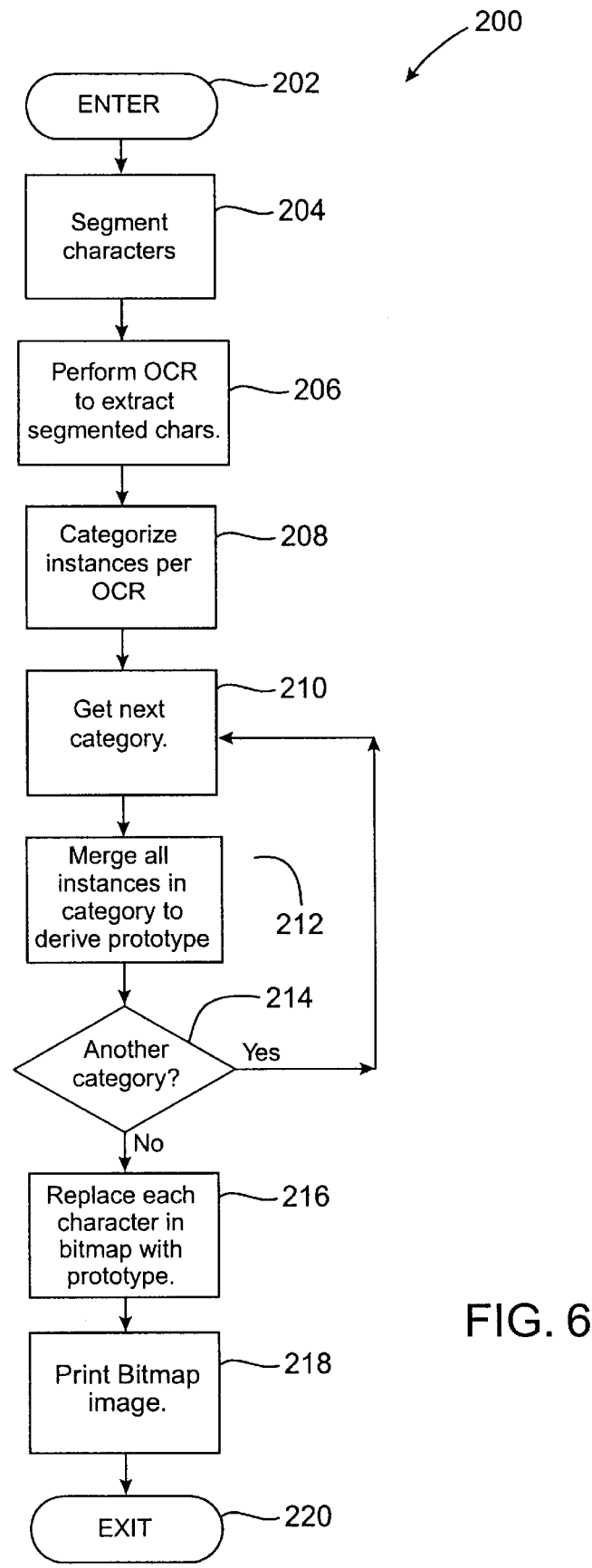
FIG. 6 shows a flowchart illustrating the basic steps in the character regeneration method.

FIG. 6 shows flowchart 200 that will next be discussed to describe the basic steps in the character regeneration method of the present invention.

In FIG. 6, flowchart 200 represents one or more software routines executing in a digital system such as computer system 100 of FIG. 1. Flowchart 200 of FIG. 6 may be implemented by any means as is known in the art. For example, any number of computer programming languages, such as "C", Pascal, FORTRAN, assembly language, etc., may be used. Further, various programming approaches such as procedural or "object oriented" programming, or artificial intelligence techniques, may be employed. The steps of flowchart 200 may be implemented by one or more software routines, processes, subroutines, modules, etc. It will be apparent that flowchart 200 is illustrative of but the broad logical flow of the method of the present invention and that steps may be added to, or taken away from, flowchart 200. For ease of discussion, we will refer to the implementation of flowchart 200 (as well as other flowcharts) as if they were a single "routine".

The routine of flowchart 200 is entered at 202. It is assumed that a bitmap image of a text document resides in system memory in the computer system. At step 204, the characters in the bitmap image are segmented, or separated, from other characters in the bitmap image into character "instances". In step 206, the segmented characters are "recognized" by a suitable optical character recognition system so that each instance is associated with a known character type. At step 208, each instance is placed into a cluster associated with the respective that character type. Thus, at the completion of step 208, all of the characters in the bitmap image of the document have been segmented and placed into clusters, where each cluster corresponds to a different character type that appears in the bitmap image of the document. Note that steps 204, 206 and 208 are, in general, part of a typical optical character recognition system. As such, any suitable OCR system may be used in conjunction with the present method to accomplish steps 204, 206 and 208.

At the completion of step 208, all of the characters in the bitmap image of the document have been placed into clusters and associated with character types.

In addition to segmenting the characters in to clusters of instances for each character type, steps 204, 206 and 208 also produce a record of the locations of each instance. This record may be, e.g., in the form of an array where one or more position numbers are used to keep track of a character's position, or order, within the bitmap image of the document. An identifier is associated with the position numbers to indicate what character type the instance at this location corresponds to.

At step 210, a category is selected for merging. At the first execution of step 210, any one of the categories created through steps 204, 206 and 208 will be selected as the first category to be processed. At step 212, each of the character instances in the cluster associated with the selected category are merged to form a single character such as the merged character of FIG. 4 discussed above for the category of lowercase "e." Details of the merge step 212 are discussed below in connection with FIG. 7. At step 214, a test is made to see whether there are other categories with clusters left to be merged. If so, execution of the routine returns to step 210 where the next category is selected for processing. In this way, all of the clusters are eventually merged so that there will be one merged character for each cluster.

After all the clusters have been merged, step 216 is executed to replace each character in the bitmap with the merged, or prototype, character corresponding to the category. The data collected at step 204 relating to the positions and types of characters in the original bitmap image is used to replace each instance of a character with the corresponding prototype character. The resulting bitmap image is the "regenerated" bitmap. Note that the regenerated bitmap may be a second bitmap created in memory so that the original bitmap remains intact.

At step 218, the "regenerated" bitmap image is used to print out a hard copy document that resembles the initial bitmap image except that each instance of a character will now be identical since the prototype character for each character type is used whenever an instance of that character type appears in the bitmap image.

After the regenerated bitmap image is printed out, the routine exits at step 220.

Even though flowchart 200 has been described as a series of discrete conceptual steps such as segmenting all characters, clustering all characters, merging all characters, replacing all characters and printing all characters, these steps may also be carried out in an "interleaved" or "multitasked" fashion. Thus, for example, where the printing hardware is slow and creates a "bottleneck" in the system the characters can be replaced in the bitmap in a line-by-line manner so that printing can commence after the first line has been replaced. Subsequent lines in the bitmap will then be replaced and readied for printing before the printer requires the lines. Other ways to organize the processing of flowchart 200 and other flowcharts herein will be apparent to one of skill in the art.

Figure 7:
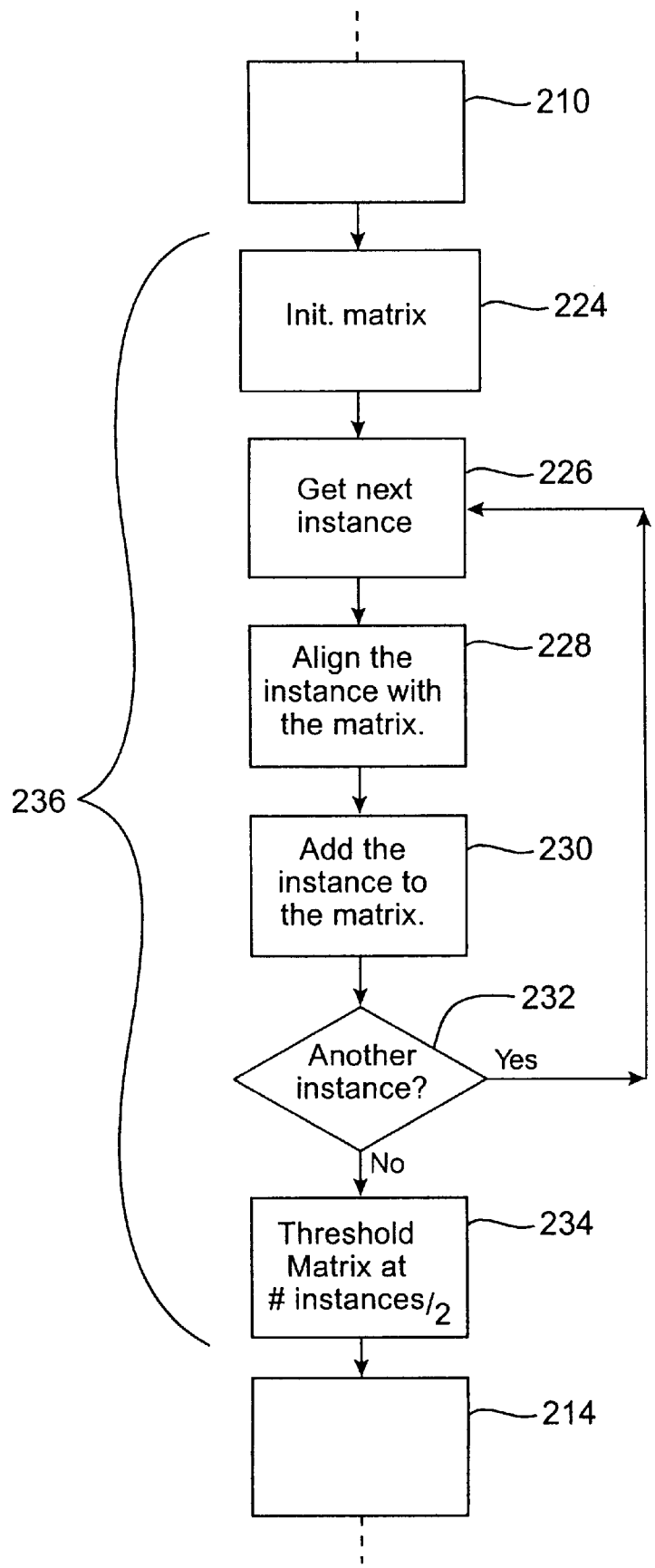
FIG. 7 shows a flowchart illustrating substeps used to implement step 212 of the flowchart of FIG. 6.

FIG. 7 illustrates a flowchart describing the substeps used to achieve step 212 of flowchart 200 in FIG. 6. That is steps 224–234, implement the merge function of step 212 in FIG. 6. Step 210 and step 214 are shown at the top and bottom, respectively, of the substeps at 236 to further illustrate that steps at 236 occur between steps 210 and 214 of the flowchart 200 in FIG. 6.

As described above in connection with FIG. 6, upon completion of step 210, a category is selected for further processing.

In this example, we continue to use the letter "e" as the category being processed. FIG. 8A shows matrix 300 within which is defined a pixel representation of the letter "e". In FIG. 8A, each square in the grid pattern of matrix 300 is a pixel that may be "on" or "off", for example, on a display screen or a piece of paper that the letter is printed on. Note that matrix 300 has space above, below, to the right and left of the letter. Matrix 300 is a "bounding box" used to segment or extract the letter from the bitmap image of text in step 204 of FIG. 6. Letters may be made up of more or less pixels than are shown in FIG. 8A and the bounding box may include more or less pixels surrounding the letter.

At step 224 of FIG. 7, the matrix is initialized with a first instance as shown by matrix 300 of FIG. 8A. At step 226, a second instance is obtained. If desired, the instances can be ordered in a list according to the number of "on" pixels, thus providing a predefined order for selecting instances for further processing as described below. FIG. 8B shows an example of a second instance 302 in the present example. Even though the pixel boundaries (the "bounding box") are not shown for this instance, it can be seen that second instance 302 is made up of 39 "on" pixels. Second instance 302 is now the "selected" or "current" instance and is the subject of the operations performed by steps 228 and 230 of FIG. 7. At step 228 of FIG. 7 second instance 302 of FIG. 8B, is aligned with matrix 300 of FIG. 8A. The alignment process consists of "shifting" the selected instance within the matrix and counting the number of overlapping "on" pixels. A number of different positions for the selected instance are chosen and the "best fit" is selected. The best fit is the position of the selected instance within the matrix that produces the highest number of pixels in the selected instance overlapping "on" pixels in the matrix.

FIGS. 8C–8E illustrate the alignment process of step 228. In FIG. 8C, matrix 300 is shown (again, without pixel boundaries for ease of illustration). Initial instance 301 is shown as in FIG. 8A except that initial instance 301 is shown unshaded to allow the overlap to be depicted. Second instance 302 is shown in a position partly overlaying initial instance 301. As can be seen from FIG. 8C, the number of overlapping pixels of initial instance 301 and selected instance 302 totals 17.

In FIG. 8D initial instance 301 is still located in its fixed position within matrix 300 but selected instance 302 has been shifted downwards and to the left to a new position within matrix 300. As can be seen in FIG. 8D, the number of overlapping on pixels of initial instance 301 and selected instance 302 totals 16.

FIG. 8E shows initial instance 301 closely overlapping with selected instance 302 within matrix 300. In FIG. 8E, the number of overlapping pixels totals 34. Thus, in this simple example, FIG. 8E is clearly the best overlap of the initial instance 301 and selected instance 302.

Figure 9A:
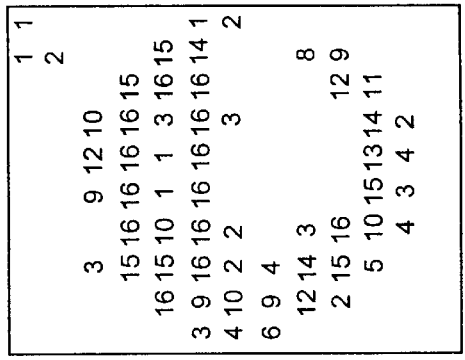
FIG. 9A shows the matrix of FIG. 8A with the instances of FIGS. 8A and 8B inside the matrix.
Figure 9B:
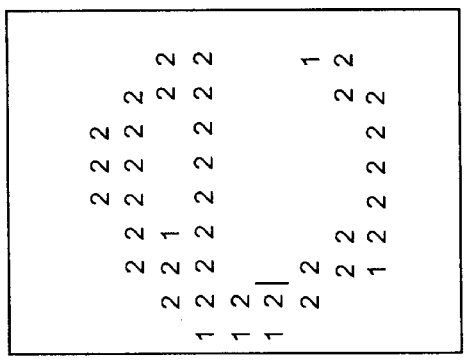
FIG. 9B shows the result of "adding" the two instances of FIG. 9A together.

At step 230 of FIG. 7, the selected instance is added to the matrix containing the initial instance in the position with the best fit as given from step 228 as described above. FIG. 9A shows the matrix identically with FIG. 8E. That is, FIG. 9A shows the best overlap between initial and selected instances obtained from the alignment procedure of step 228. FIG. 9B shows the result of "adding" the two instances of FIG. 9A together.

Note that FIG. 9B is a pictorial representation of the result of adding the two instances within the matrix. In a preferred embodiment, each element within the matrix 300 of FIG. 9A is represented by a numeric value contained in, e.g., a byte of data. The bytes are stored in an array that has the same dimensions as matrix 300. In FIG. 9B, a one in a matrix element location shows that the byte corresponding to that matrix element has a value of 1. Similarly, a value of 2 shows that the byte corresponding to that matrix element location has a value 2. Where no value is shown for the corresponding matrix element location, that matrix element location has a value of 0. Thus, it is seen from FIG. 9B that the data array corresponding to matrix 300 keeps a running total of the number of "on" pixels when instances of characters in the cluster are overlayed, aligned and "added".

At step 232 of FIG. 7, a test is made to see whether another instance of a character exists in this category. If so, execution proceeds to step 226 where the next instance is obtained from the sorted list. In a preferred embodiment, each next instance is aligned with the running total matrix to find a best fit. Any pixels in the running total matrix that overlap with pixels in the next instance are detected. The overlapped pixel locations are used to indicate which values in the data array (corresponding to the overlapped pixel locations) are to be incremented. In a preferred embodiment an increment of 1 is used.

Figure 9C:
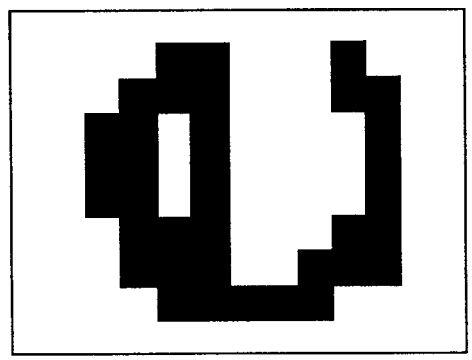
FIG. 9C shows the result of performing steps 226–232 of FIG. 7 for a cluster of 16 instances of the letter "e"

FIG. 9C shows the result of performing steps 226–232 for a cluster of 16 instances of the letter "e". Note that the data in FIG. 9C is merely illustrative and does not necessarily correspond to the actual merging of the cluster of FIG. 3. As can be seen from FIG. 9C, some bytes in the data array have a value of 16. This means that every instance included an on pixel at the corresponding matrix element location. Where a number is not shown for an element location, the value of the corresponding byte in the data array is 0. Where the numbers range between 0 and 16, the numbers indicate the number of instances that had an "on" pixel at that matrix location.

At step 234 of FIG. 7, thresholding is performed. A simple manner for thresholding is to establish a threshold whose value is the number of instances in the cluster divided by 2. In the present example with the number of cluster instances at 16, the threshold value would be 8.

Figure 9D:
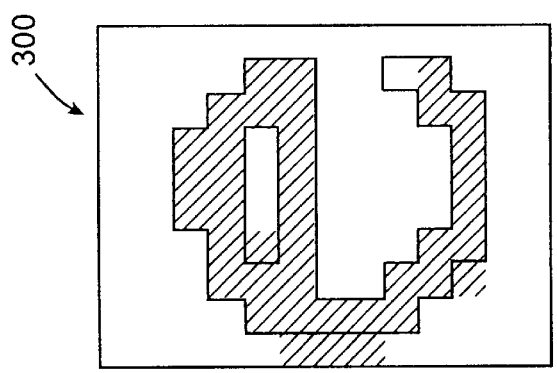
FIG. 9D is a prototype character based on the data of either of FIGS. 9B or 9C.

Referring to FIG. 9C, using a threshold value of 8, and using the rule that matrix elements whose array value is 8 or less are to be off, while matrix elements whose corresponding array value is 9 or greater are to be on, the idealized, or prototype, character of FIG. 9D is derived. This prototype character is the character used in the replacement step 216 discussed above in connection with FIG. 6.

Note that, although the present example uses a simple monochrome representation of characters (that is, "on" or "off" pixels), the present invention is adaptable for use with characters represented in a gray scale. That is, instead of a bitmap representation where each pixel is represented by a single bit capable of having two states, on or off, using multiple bits to indicate a grayness of the pixel (e.g., 0 being off while the maximum value being the darkest and intermediate values ranging from lightest to darkest in accordance with the lowest to highest values). Then the aligning step 228 of FIG. 7 will be similar to that discussed above for the monochrome characters except that the best fit will be detected by totalling the gray scale value of pixels that overlay the initial character instance within the matrix. Adding step 230 can be accomplished as above, by adding the gray scale values of the selected instance to the corresponding byte in the data array for the matrix element for that pixel. Thresholding step 234 can be as described above except that the threshold value is multiplied by the maximum value possible for a grey scale pixel. For example, if there are four possible shades for pixel, i.e., two bits representing each pixel giving values of 0, 1, 2 and 3, the value obtained above as number of instances divided by two which equal 8 will be multiplied by, e.g., 3 to give a threshold value of 24. Alternatively, instead of multiplying the threshold value by the maximum possible grey scale value, an average grey scale value could be used. Also, given an output device that is able to display or print in grey scale, thresholding would not be necessary since the output device can use the (scaled) range of values.

Modifications to the above implementation may be included to provide additional advantages. For example, if the OCR identifications of characters are unreliable, an additional step can be introduced between steps 214 and 216 of FIG. 6. This additional step would compare each instance of a character with each derived prototype in a manner similar to the alignment step 228 of FIG. 7. Should an instance more closely match a prototype other than the prototype that the instance was used to derive in step 212 of FIG. 6 then the instance is flagged as erroneously categorized. The prototype is re-derived without using the erroneously categorized instance and the instance is considered as belonging to a different category, or character type, so that when characters are replaced in step 216 of FIG. 6 the replacement of the instance will be with the more closely matching prototype. Alternatively, the original bitmap image of the instance may be left in place (i.e., no replacement of the instance occurs).

The OCR description of the characters may fail to provide typestyle information. Words which appear in italics or boldface need to be identified so they are not falsely restored to the standard typestyle. This can be done by examining the distance between each character in the word, and the derived prototype of the category. If the shape of each character poorly matches its respective prototype, it is probable that the word appears in a different typestyle. The original bitmap images for the characters may be carried through, or typestyle specific prototypes may be derived.

If, after derivation the prototypes contain detectable jagged contours, existing methods of individual character smoothing may be applied to the prototypes.

The length of the processing time of the described regeneration algorithm might be burdensome for some facsimile users. A faster method would use some subset of the character instances to develop the prototypes. A control could be provided to the user, allowing adjustment output quality. Multiple prototypes could be computed simultaneously if parallel processing is available.

Other applications of the present invention are possible. One use could have application in a digital copier system. For example, given an original where the text was too dark, the method would be applied to the scanned input. Then, by raising the threshold used to produce the prototypes, the resulting text quality would be improved. Another application would be where the initial bitmap image includes symbols other than the standard characters of alphanumerics, punctuation marks, etc. These symbols, such as mathematical symbols and handwriting, could be recognized by appropriately tailored OCR systems and the methods described herein would be used to similarly process and derive prototypes for them.

Regeneration, according to the present invention, also automatically corrects for "skew" in the text lines and uneven alignment of characters. That is, where a letter in the text doesn't line up with other letters (uneven alignment) or where the entire text of a page is not aligned with the page borders (skew) the regenerated text will be correctly aligned after regenerating and printing as described herein.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense, the invention being limited only by the provided claims.

What is claimed is:

1. A method for producing a document representation from a bitmap image of a document, the method executing on a digital system, the digital system including a processor, memory, user input device and output device, the bitmap image of a document including a plurality of instances of a first text character and an instance of a second text character, wherein the bitmap image includes a plurality of pixels stored in the memory of the computer, the method comprising the steps of:

detecting first, second and third instances of the first text character in the bitmap image;

using the first, second and third detected instances to derive a first prototype character;

detecting the instance of the second character;

using the instance of the second character to derive a second prototype character;

replacing each instance of the first character with the first prototype character to produce the document representation, the step of replacing includes the substeps of:

(a) comparing the font of the instance to the prototype characters, the step of comparing the font comprising the following substeps:

(1) examining the differences between each character in a word and the associated prototype character to distinguish words in different fonts;

(2) determining a font difference for the entire word from the character differences; and (3) selectively using the original bitmap image of the word if the examined characters differ from their associated prototype characters by more than a predetermined threshold; and (b) only performing the replacing operation if the font of the instance is determined to be similar to the font of the prototype character;

repeating the above steps for a plurality of subsequent documents; and for each of the plurality of subsequent documents, initializing the digital system before performing the above steps so that instances from prior documents will not affect the derivation of a prototype character.

2. A method for producing a document representation from a bitmap image of a document, the method executing on a digital system, the digital system including a processor, memory, user input device and output device, the bitmap image of a document including a plurality of instances of a first text character and an instance of a second text character, wherein the bitmap image includes a plurality of pixels stored in the memory of the computer, the method comprising the steps of:

detecting first, second and third instances of the first text character in the bitmap image;

using the first, second and third detected instances to derive a first prototype character;

detecting the instance of the second character;

using the instances of the second character to derive a second prototype character;

replacing each instance of the first character with the first prototype character to produce the document representation, the step of replacing includes the substeps of:

(a) comparing the typestyle of the instance to the prototype characters, the step of comparing the typestyle comprising the following substeps:

(1) examining the differences between each character in a word and the associated prototype character to distinguish words in different typestyles;

(2) determining a typestyle difference for the entire word from the character differences; and (3) selectively using the original bitmap image of the word if the examined characters differ from their associated prototype characters by more than a predetermined threshold; and (b) only performing the replacing operation if the font of the instance is determined to be similar to the font of the prototype character;

repeating the above steps for a plurality of subsequent documents; and for each of the plurality of subsequent documents, initializing the digital system before performing the above steps so that instances from prior documents will not affect the derivation of a prototype character.

3. A method for regenerating characters in a bitmap image representing a document resulting in a regenerated bitmap image, the method executing on a digital system, the digital system including a processor, memory, user input device and output device, the document including a plurality of instances of a first text character, wherein the bitmap image includes a plurality of pixels stored in the memory of the computer, the method comprising the steps of:

detecting the plurality of instances of the first character in the bitmap image;

deriving a first prototype character from the plurality of instances, in the bitmap image, of the first character, wherein a bitmap of the prototype character is a function of the bitmaps of the instances of the first character;

creating a regenerated bitmap image wherein the bitmap of each instance of the first character in the bitmap image is replaced by the bitmap of the prototype character; and outputting the regenerated bitmap image.

4. The method of claim 3, further comprising the steps of:

detecting a second plurality of instances of a second character in the bitmap image;

deriving a second prototype character from the second plurality of instances in the bitmap image, of the second character, wherein a bitmap of the second prototype character is a function of the bitmaps of the instances of the second character; and replacing each instance of the second character in the bitmap image with the bitmap of the second prototype character.

5. The method of 3, further comprising the steps of detecting and replacing instances of third and subsequent characters.

6. A method for producing a bitmap document representation from a bitmap image of a portion of a document, the method executing on a digital system, the digital system including a processor, memory, user input device and output device, the bitmap image of the portion of the document including a plurality of instances of a first character and a plurality of instances of a second character, the method comprising the following steps performed by the processor:

detecting instances of the first character and instances of the second character in the bitmap image and storing the detected instances in the memory;

using the detected instances of the first character to derive a first prototype character, wherein a bitmap of the first prototype character is a function of the bitmaps of the instances of the first character;

using the detected instances of the second character to derive a second prototype character, wherein a bitmap of the second prototype character is a function of the bitmaps of the instances of the second text character;

generating the bitmap document representation from the bitmap image by performing, for each character in the bitmap image, the following steps:

(1) when the character is an instance of the first character, replacing a bitmap of the character in the image with a bitmap of the first prototype character; and (2) when the character is an instance of the second character, replacing a bitmap of the character in the image with a bitmap of the second prototype character; and outputting the bitmap image containing instances of characters replaced with bitmaps of prototype characters as the bitmap document representation.

7. The method of claim 6, wherein the digital system comprises a fax machine and the portion of a document is derived from a fax transmission to the digital system.

8. The method of claim 6, wherein the replacing steps each include the substeps of:

comparing the font of the instance to the prototype characters; and only performing the replacing operation if the font of the instance is determined to be similar to the font of the prototype character.

9. The method of claim 6, further comprising the step of smoothing the contours of the bitmap of the prototype character before performing any of the steps of replacing an instance of a character with a prototype character.

10. The method of claim 6, wherein the user input device is used to specify the number of instances of a character that are to be used to derive the prototype character.

11. The method of claim 6, further comprising the steps of:

determining that a character is not similar to other detected instances and copying the character into the bitmap document representation as it appears in the bitmap image and at a position in the bitmap document representation corresponding to the non-similar character's position in the bitmap image; and producing a printed version of the bitmap document representation.

12. The method of claim 6, further comprising the step of correcting the skew in text lines of the document representation.

13. The method of claim 6, further comprising the step of correcting uneven alignment of characters in the document representation.

* * * * *